United States Patent [19]
Turner

[11] Patent Number: 5,280,685
[45] Date of Patent: Jan. 25, 1994

[54] MOBILE PLANT CHEMICAL APPLICATION DEVICES

[76] Inventor: James R. Turner, 5900 Orange Ave., Ft. Pierce, Fla. 32954

[21] Appl. No.: 890,871

[22] Filed: Jun. 1, 1992

[51] Int. Cl.$^5$ .......................................... A01B 41/00
[52] U.S. Cl. ................................. 47/1.7; 239/169
[58] Field of Search ............... 239/163, 167, 168, 169; 47/1.7, 1.5

[56] References Cited

U.S. PATENT DOCUMENTS

| | | | |
|---|---|---|---|
| 3,959,924 | 6/1976 | Allen | 47/1.7 |
| 4,206,569 | 6/1980 | Randolph | 47/1.7 |
| 4,586,287 | 5/1986 | Bleasdale | 47/1.7 |
| 5,012,608 | 5/1991 | Brown | 47/1.7 |

FOREIGN PATENT DOCUMENTS

| | | | |
|---|---|---|---|
| 09540 | 10/1989 | PCT Int'l Appl. | 47/1.7 |
| 1544215 | 2/1990 | U.S.S.R. | 47/1.7 |

*Primary Examiner*—Henry E. Raduazo
*Attorney, Agent, or Firm*—Carroll F. Palmer

[57] ABSTRACT

A device for attachment to a tractor or similar vehicle for safe spray application of liquid chemicals around trees or like plants basically includes an elongated boom unit and a multinational spray unit pivoted by its inboard end on the boom unit, formed of an inboard section and an outboard section. The outboard section carries a spray nozzle and is pivoted by its inboard end to the outboard end of the inboard section. Spring members normally bias both sections of the spray unit into alignment with the boom unit, but first allow the inboard section followed, in turn, by the outboard section to move out of such alignment so they partially encircle a tree as the spray unit of the device contacts the trunk of the tree while the tractor moves the device forward and past the tree. Proximity switches and a photocell sense the correct positioning of the tree to emit sprayed chemical from the nozzle only when the spray unit is in contact with the tree.

7 Claims, 4 Drawing Sheets

MOBILE PLANT CHEMICAL APPLICATION DEVICES

BACKGROUND OF THE INVENTION

1. Field of the Invention

This application relates to mobile devices for applying chemicals to assist in the cultivation of trees and other plants. More particularly, it concerns devices to be borne by tractors or like vehicles for spraying chemical liquids around the base of trees or other immobile, upstanding plants.

2. Description of the Prior Art

Orchards and groves of trees or similar upstanding plants require periodic application of plant chemicals, e.g., nematoicides to control nematodes present in the earth in which the plants grow, etc. Such applications can be made by workers using wand sprayers supplied from back-pack canisters or vehicle carried tanks. Alternatively, such application may be by spray jets mounted on a boom carried by a tractor or the like. An improvement in such tractor applicators has been disclosed in U.S. Pat. No. 4,586,287.

The present invention provides further improvements in devices used to accomplish the type of plant chemical applications as discussed above.

OBJECTS

A principal object of the invention is the provision of improved devices for mobile application of chemicals required in the cultivation of trees and other plants.

Further objects include the provision of:

1. New forms of plant chemical application devices for mounting on tractors or the like that permit the tractors to move along rows of trees growing in orchards or groves while the devices contact lower portions of the trunks of the trees and automatically apply the plant chemicals only when the device is in contact with a tree trunk.

2. Such devices that mitigate creation of air-bourne mists of the sprayed chemical thereby protecting workers against being contacted with the sprayed chemical.

3. Such devices that maximize the effective application of the sprayed chemical to the plant growing area that requires the chemical treatment.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of a device for attachment to a tractor or like vehicle mounting a container of chemical liquid for mobile application by the device around trees or like immobile, vertically extending plants.

The new device comprises an elongated boom unit and multi-sectional spray unit.

The boom unit is defined by a first outboard end and a first inboard end located along a longitudinal aids for attachment by the first inboard end to the vehicle to extend laterally therefrom.

The spray unit comprises an inboard section and an outboard section.

The inboard section is defined by a second outboard end, a second inboard end, a first front side, and a first back side.

The outboard section is defined by a third outboard end, a third inboard end, a second front side and a second back side.

The second inboard end of the inboard section is pivoted on the first outboard end to permit the inboard section to swing from a first position of alignment relative to the boom unit to a second position out of the alignment with the boom unit about an axis normal to the longitudinal axis.

The third inboard end of the outboard section is pivoted on the second outboard end to permit the outboard section to swing from a initial position of alignment with the inboard section to an altered position out of the alignment with the inboard section about an axis normal to the longitudinal axis.

The spray unit includes conduit means to convey liquid chemical from the container carried by the vehicle to the spray unit.

The inboard and outboard sections include a plurality of rollers mounted along their front sides for rotation about axes that extend normal to the longitudinal axis.

First spring means biases the inboard section into its first position and second spring means biases the outboard section into its initial position. The second spring means has a greater biasing force than the first spring means so that when the inboard section is caused to move out of alignment with the longitudinal axis of the boom unit, the outboard section will tend to remain in alignment with such axis.

There is at least one liquid spray nozzle operatively connected to the conduit means of the spray unit of the device to receive liquid chemical from the vehicle container and spray it onto a tree trunk or the like that has come in contact with the spray unit. Advantageously, such spray nozzle is carried upon the third outboard end of the outboard section. In some embodiments, the spray unit has a plurality of spray nozzles that are positioned to spray liquid chemical at different angles.

Included in the device is valve means to regulate flow of the liquid chemical in the conduct means and switch means is mounted on the spray unit to control operation of the valve. Preferably, the switch means comprises a photoelectric cell, a first proximity switch carried by the inboard section and a second proximity switch carried by the outboard section.

BRIEF DESCRIPTION OF THE DRAWINGS

A more complete understanding of the invention can be obtained by reference to the accompanying drawings in which:

FIG. 1 is an isometric view, partially in phantom, of an applicator device of the invention.

FIG. 2 is a fragmentary, plan view of the spray unit of the applicator device of FIG. 1 as it appears in its fully extended mode.

FIG. 3 is a lateral view of the spray unit shown in FIG. 2.

FIG. 4 is a plan view like FIG. 2 with the spray unit in it fully retracted mode.

FIG. 5 is a plan view like FIG. 2 with the spray unit in it partially retracted mode.

FIG. 6 is a detailed, front view of a sprayer portion of the new applicator device.

FIG. 7 is a schematic diagram of electrical components of the new applicator device.

DESCRIPTION OF THE PREFERRED EMBODIMENTS

Figure 1:
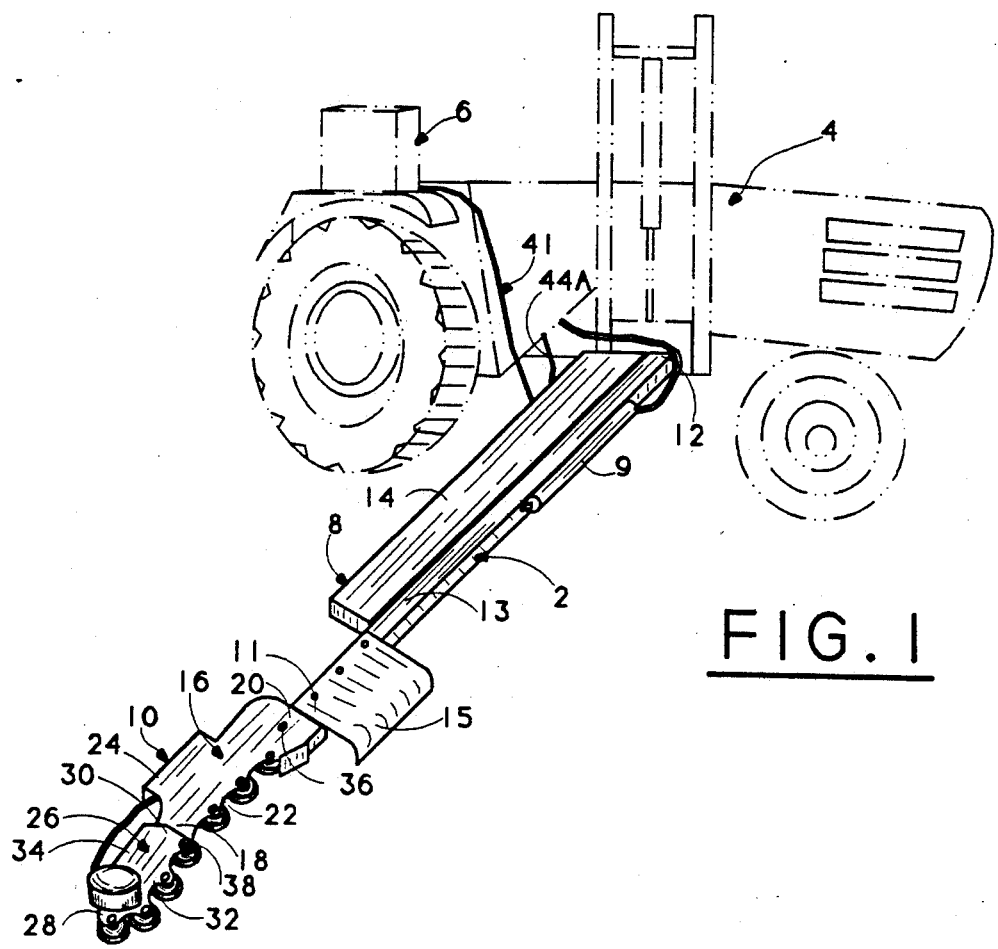
Figure 6:
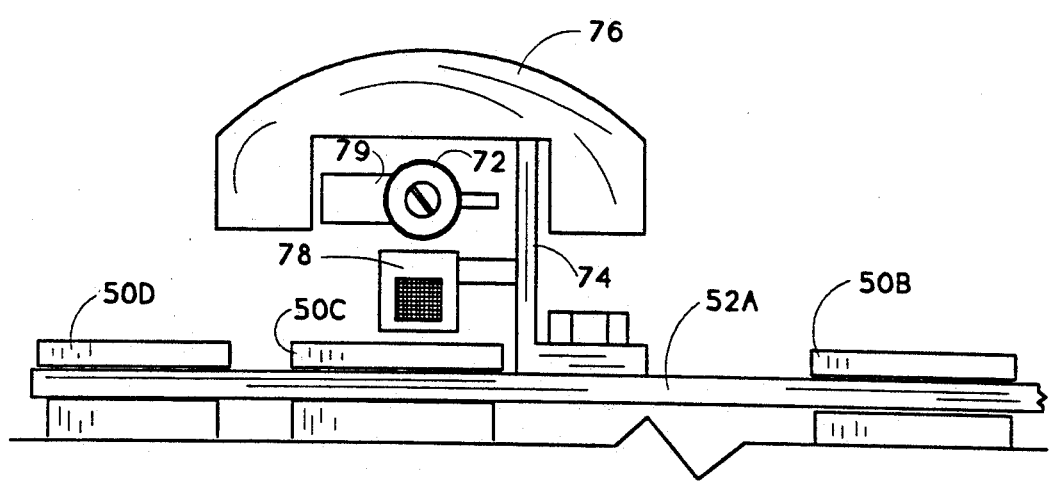

Device 2 of the invention for attachment to a tractor or like vehicle 4 mounting a container 6 of chemical liquid for mobile application around trees or like plants (not shown) comprises an elongated boom unit 8 and a multi-section spray unit 10.

Boom unit 8 has an outboard end 11 and an inboard end located 12 along a longitudinal axis for attachment by end 12 to the vehicle 4 to extend laterally therefrom as shown. Unit 8 comprises a longitudinal girder 13, canopy 14 and shield 15.

Boom unit 8 may include auxiliary equipment to assist its operation, e.g., hydraulic cylinder 9 by which unit 8 may be raised and lowered for storage or to adjust to variations in land contour.

Multisection spray unit 10 comprises an inboard section 16 defined by a outboard end 18, an inboard end 20, a front side 22, and a back side 24 and an outboard section 26 defined by a outboard end 28, a inboard end 30, a front side 32 and a back side 34.

Figure 2:
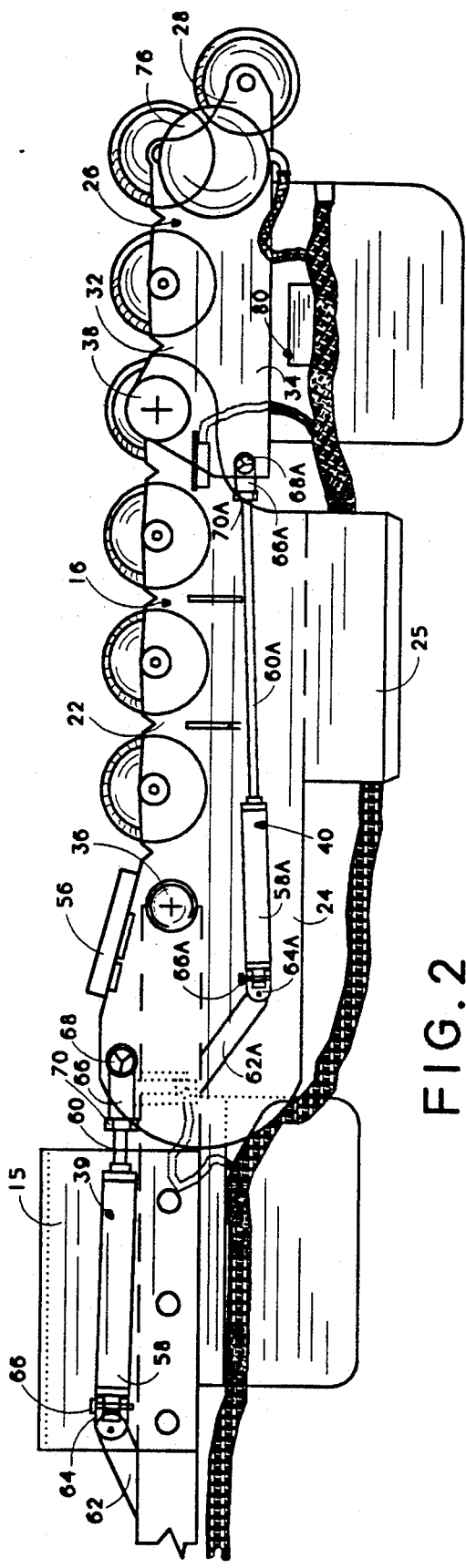
Figure 3:
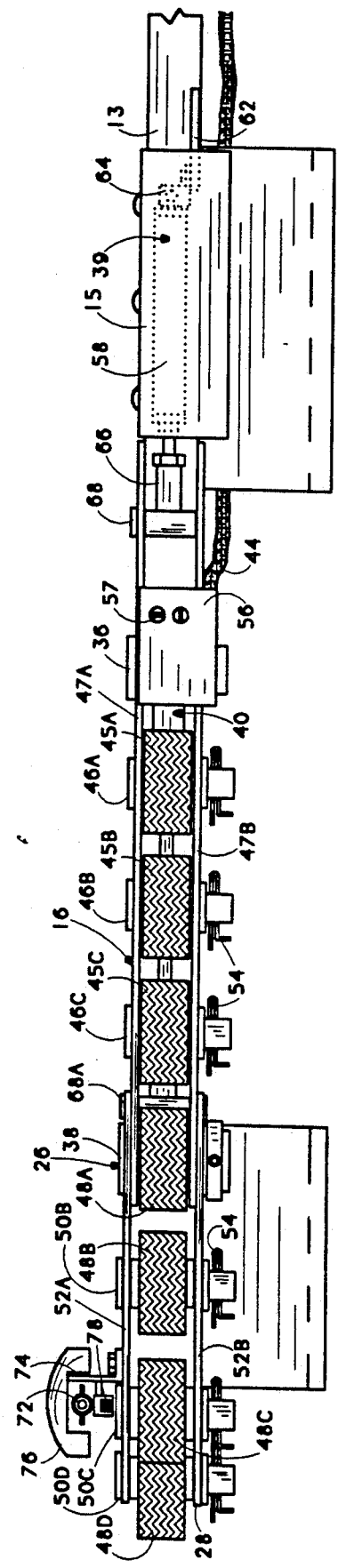
Figure 4:
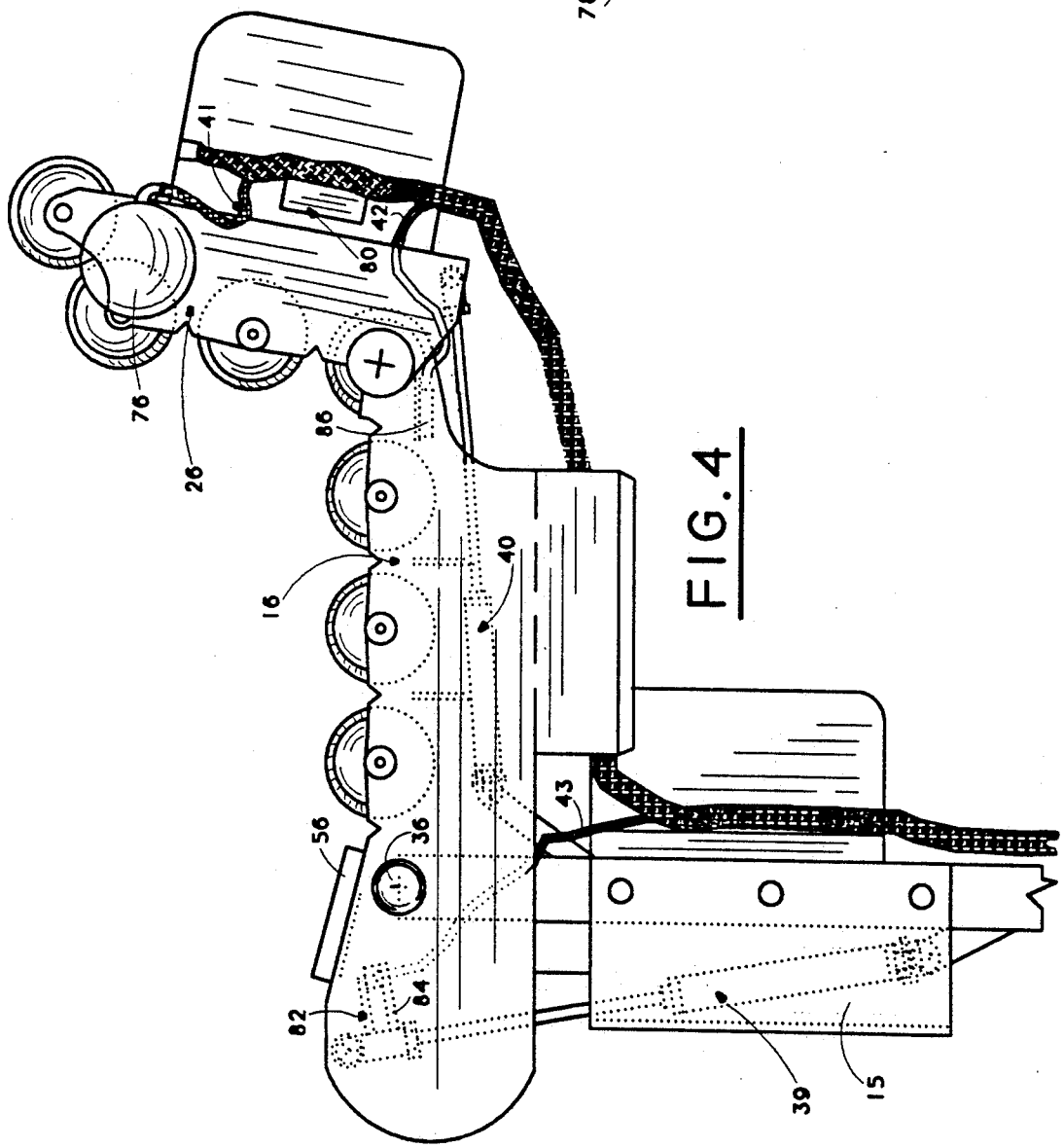
Figure 5:
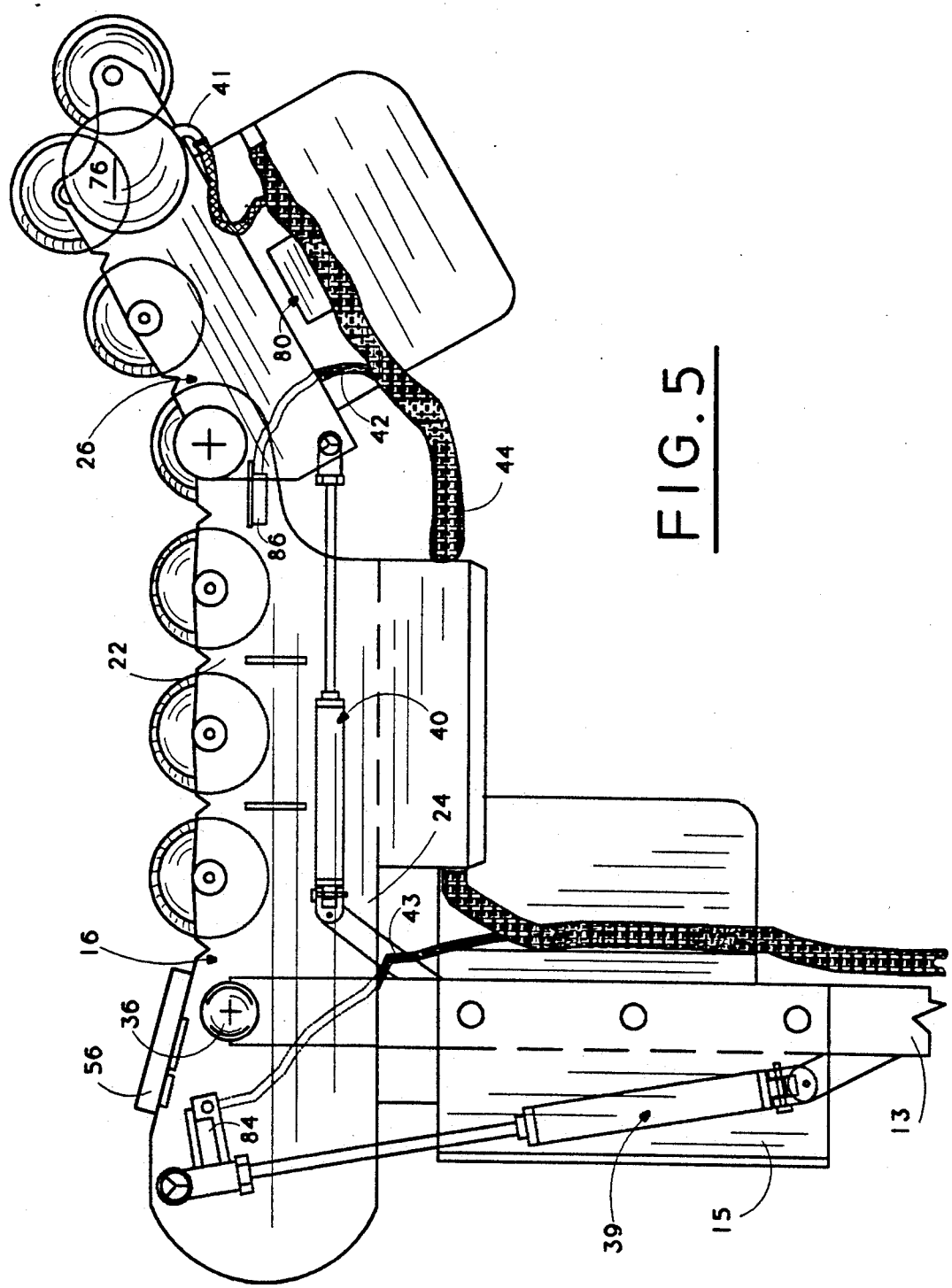

Inboard end 20 pivots on outboard end 11 about axle 36 to permit inboard section 16 to swing from a first position of alignment relative to the boom unit 8 as shown in FIGS. 1 & 2 to a second position out of the alignment with the boom unit 8 as shown in FIGS. 4 & 5. Also, inboard end 30 pivots about axle 38 on the outboard end 18 to permit outboard section 26 to swing from a initial position of alignment with inboard section 16 as shown in FIGS. 1 & 2 to altered positions out of the alignment with inboard section 16 as shown in FIGS. 4 & 5.

Spring means 39 biases inboard section 16 into its first position and spring means 40 biases the outboard section 26 into its initial position.

Conduit means 41 serves to convey liquid chemical from the container 6 to the spray unit 10. Means 41 along part of its length is covered by canopy 14 and is associated with electrical leads 42 and 43 in bundle 44. A portion of back side 24 of inboard section 16 extends to provide a shield/support 25 for the bundle 44 at the inboard end of which the conduit means 41 and the connectors 44A for the leads 42 & 43 enter.

Inboard section 16 has a plurality of rollers 45A, 45B and 45C mounted along front side 22 for rotation about pins 46A, 46B and 46C that fit through bores in upper plate 47A and lower plate 47B. Similarly, outboard section 26 has a plurality of rollers 48A, 48B, 48C and 48D mounted along front side 32 for rotation respectively about axle 38 and pins 50B, 50C & 50D that fit through bores in upper plate 52A and lower plate 52B. Pins 46A–C and 50B–D are held in position by cotters 54.

Inboard section 16 has a guide block 56 fastened to its front side 22 by screws 57 to assist in engagement of the spray unit 10 with a tree or the like (not shown) as the device 2 is moved forward by the vehicle 4.

Spring means 39 comprises a cylinder 58, piston rod 60, mounting bracket 62, knuckle 64, pin 66, clevis 66, mounting pin 68 and lock nut 70. Spring means 40 comprises a cylinder 58A, piston rod 60A, mounting bracket 62A, knuckle 64A, pin 66A, clevis 66A, mounting pin 68A and lock nut 70A.

Spring means 40 has a greater biasing force than spring means 39 with the result that when spray unit 10 is moved by vehicle 4 into contact with a tree, outboard section 26 will tend to remain aligned with the longitudinal axis of boom unit 2 while inboard section 16 moves to its full transverse extension (see FIG. 4). Then as the tree (not shown) comes into contact with outboard section 26, the biasing force of spring means 40 will be overcome and section 26 will move out of alignment with boom unit 2 (see FIG. 5).

Spray nozzle 72 is carried by bracket 73 and standard 74 upon outboard end 28 of outboard section 26 beneath the dished shield 76. Photoelectric cell 78 which serves to actuate nozzle 72 and nozzle solenoid 79 are also mounted under shield 76. Nozzle 72 is operatively connected to the conduit means 41 to receive and spray the liquid chemical from container 6. Additional spray nozzles (not shown) may be mounted at other positions, e.g., on inboard section 16 to spray liquid chemical at the same or different angles to nozzle 72.

Device 2 is provided with solenoid valve means 80 to regulate flow of the liquid chemical in the conduct means 41 and switch means 82 is mounted on the spray unit 10 to control operation of the valve means 80. Switch means 82 includes first proximity switch 84 with electrical leads 43 carried by the inboard section 16 and second proximity switch 86 with electrical leads 42 carried by the outboard section 26.

Figure 7:
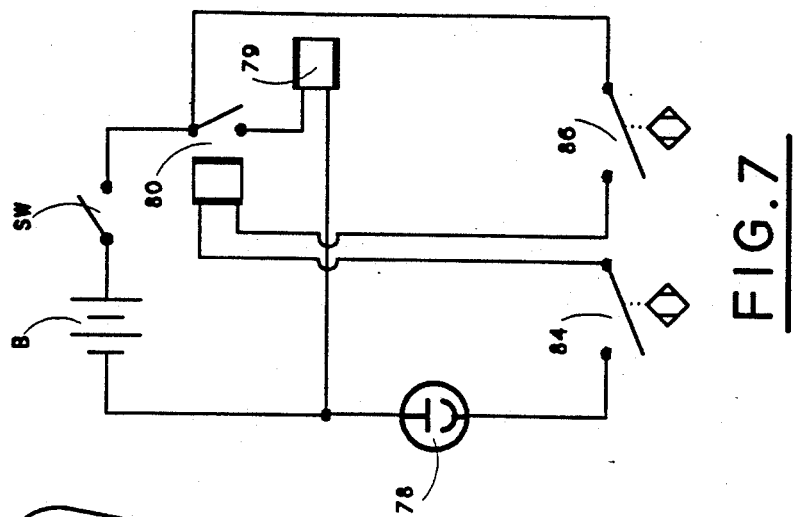

The interconnection of switch means 82 with solenoid valve means 80 for controlling flow of the liquid chemical in the conduct means 41 and, it turn, to the nozzle 72 is shown in FIG. 7.

The battery B and switch SW are typically carried on the vehicle 4. As seen, for the field of solenoid switch 80 to be energized to close it, photocell 78, proximity switch 84 and 86 must all be closed by all three of them simultaneously detecting the presence of the tree trunk. When this occurs, the nozzle solenoid 79 will energize to emit chemical liquid through the nozzle 72.

In use of the device 2, on start up, it will be mounted on the tractor 4 with the inboard and outboard sections 16 & 26, respectively, of the spray unit 10 aligned with the longitudinal axis of the boom 13 as shown in FIG. 1. The tractor 4 will travel at about 2–4 mph. parallel to a row of trees (not shown) positioned to the right of the tractor a distance such that the trunks of the trees will engage the front side 22 of the inboard section 16 of spray unit 10 when the device 2 contacts each tree.

As the front side 22 approaches a tree, the proximity switch 82 will sense its presence and close. Then, as front side 22 engages the tree, inboard section 16 of spray unit 10 will bend backwards out of alignment with boom 13, but because of the greater bias force of spring means 40 over spring means 39, outboard section 26 will initially remain aligned with boom 13 (see FIG. 4).

Further movement of tractor 4 will cause spray unit 10 to move relative to the tree so it comes into contact with front end 32 of outboard section 26. As this occurs, proximity switch 86 and photocell 78 will sense the presence of the tree and close. When this happens, solenoid 79 will be energized and nozzle 72 will spray chemical liquid from container 6 around a major part of the circumference of the tree trunk.

Continued forward movement of tractor 4 then causes the spray unit 10 to slide off the tree and revert to its initial position as shown in FIG. 1 for contact with the next tree in the row to be sprayed by the device 2. At the same time, photocell 78 plus proximity switches 84 and 86 open so spraying of chemical liquid from nozzle 72 ceases.

The combination of two proximity switches 84 and 86 provides an essential safety feature. Thus, this serves to prevent the nozzle 72 from spraying chemical liquid in the event a worker involved with the spraying operation were to approach the spray unit and be detected by the photocell 78. This is an important feature, since many of the chemical liquids for which the device 2 is designed to handle are highly toxic.

The combination of an inboard section and an outboard section in the spray unit 10 provides a unique functional feature since this enables spray applied by the device 2 to a tree to cover a major part of the circumference of the tree trunk with a single pass of the device 2 which is important to effective application of the type of chemical liquids for which the device 2 is designed to handle.

I claim:

1. A device for attachment to a tractor or like vehicle mounting a container of chemical liquid for mobile application by said device around trees or like immobile, vertically extending plants which comprises:
   an elongated boom unit defined by a first outboard end and a first inboard end located along a longitudinal axis for attachment by said first inboard end to said vehicle to extend laterally therefrom;
   a multi-section spray unit comprising:
      an inboard section defined by a second outboard end, a second inboard end, a first front side, and a first back side and
      an outboard section defined by a third outboard end, a third inboard end, a second front side and a second back side,
   said second inboard end being pivoted on said first outboard end to permit said inboard section to swing from a first position of alignment relative to said boom unit to a second position out of alignment with said boom unit about an axis normal to said longitudinal axis, and
   said third inboard end being pivoted on said second outboard end to permit said outboard section to swing from a initial position of alignment with said inboard section to an altered position out of said alignment with said inboard section about an axis normal to said longitudinal axis; and conduit means to convey liquid chemical from said container to said spray unit;
   said inboard section comprising:
      a plurality of rollers mounted along said first front side for rotation about axes that extend normal to said longitudinal axis and
      first spring means biasing said inboard section into said first position;
   said outboard section comprising:
      a plurality of rollers mounted along said second front side for rotation about axes that extend normal to said longitudinal axis,
      second spring means biasing said outboard section into said initial position, said second spring means having a greater biasing force than said first spring means, and
      at least one liquid spray nozzle operatively connected to said conduit means to receive and spray said liquid chemical.

2. The device of claim 1 wherein said spray nozzle is carried upon said third outboard end of said outboard section.

3. The device of claim 1 wherein said outboard section has a plurality of spray nozzles that are positioned to spray liquid chemical at different angles relative to said longitudinal axis.

4. The device of claim 2 that further comprises valve means to regulate flow of said liquid chemical in said conduct means and switch means mounted on said spray unit to control operation of said valve.

5. The device of claim 4 wherein said switch means comprises a photoelectric cell.

6. The device of claim 5 wherein said switch means comprises a first proximity switch carried by said inboard section.

7. The device of claim 6 wherein said switch means comprises a second proximity switch carried by said outboard section.

* * * * *